Dec. 19, 1939.   R. E. DALY ET AL   2,184,094
HUMIDIFYING APPARATUS
Filed Nov. 25, 1936   3 Sheets-Sheet 1
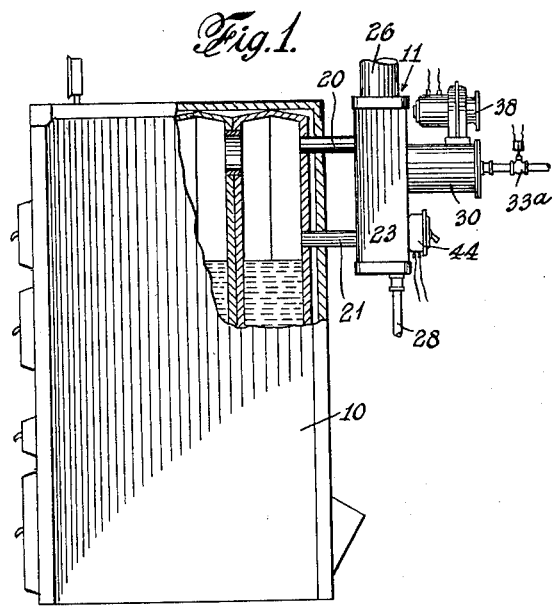
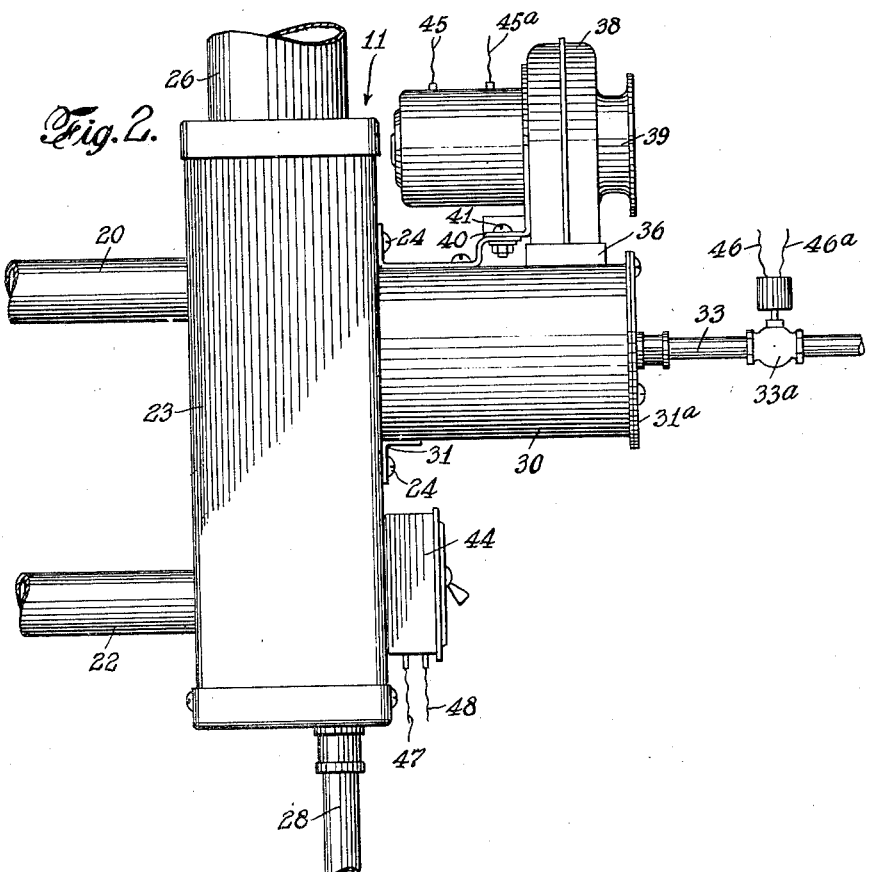
INVENTORS
ROBERT E. DALY and BERNARD GOERG
BY *Conrad A. Dieterich*
their ATTORNEY.

Dec. 19, 1939.　　R. E. DALY ET AL　　2,184,094
HUMIDIFYING APPARATUS
Filed Nov. 25, 1936　　3 Sheets-Sheet 2
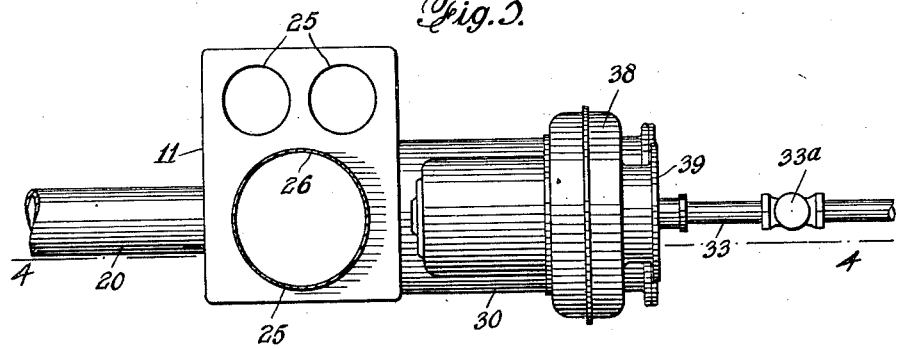
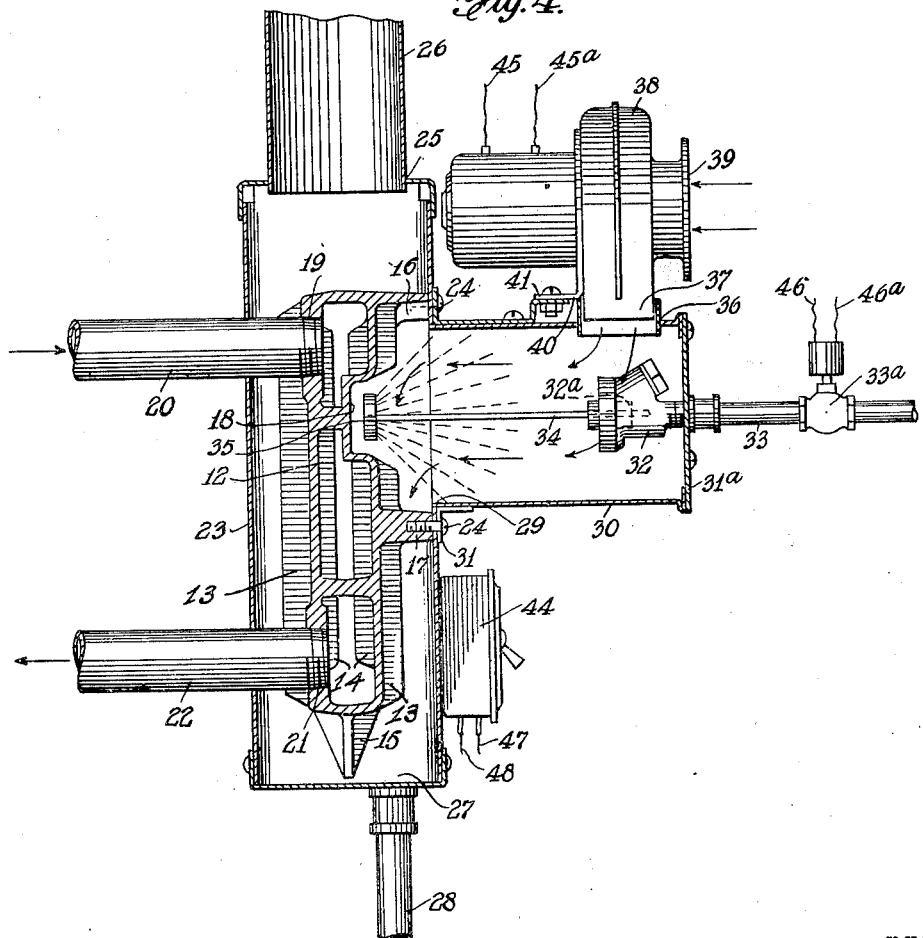
INVENTORS:
ROBERT E. DALY and BERNARD GOERG
BY Conrad A. Dieterich
their ATTORNEY.

Dec. 19, 1939.  R. E. DALY ET AL  2,184,094
HUMIDIFYING APPARATUS
Filed Nov. 25, 1936  3 Sheets-Sheet 3
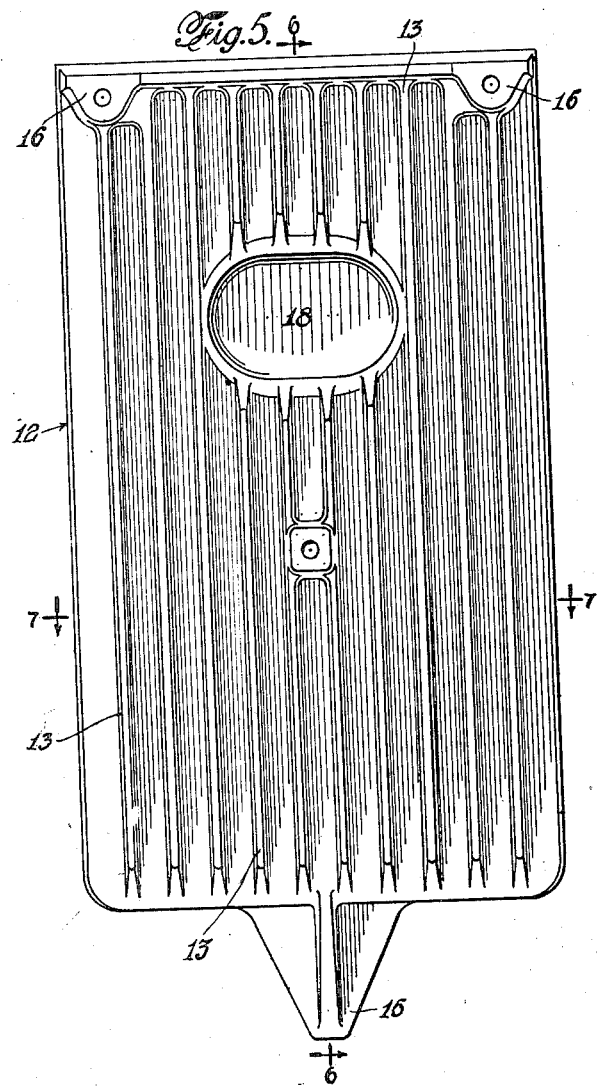
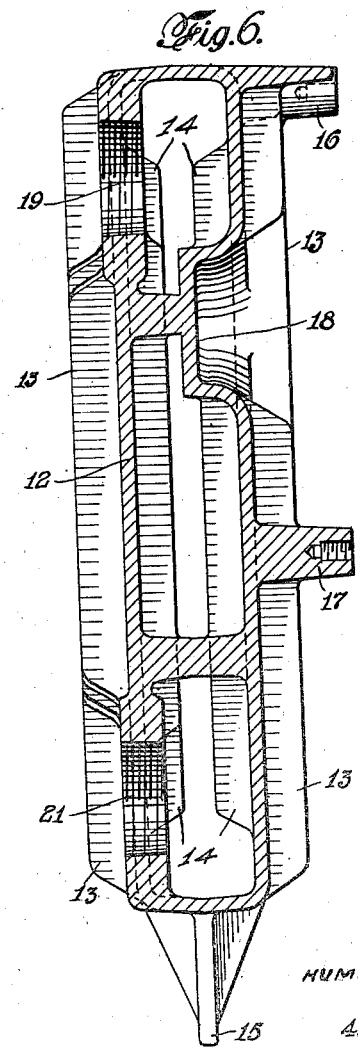
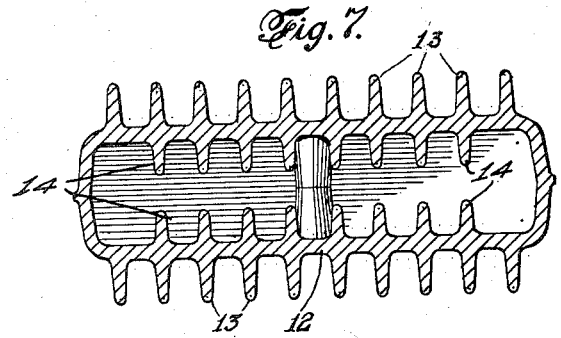
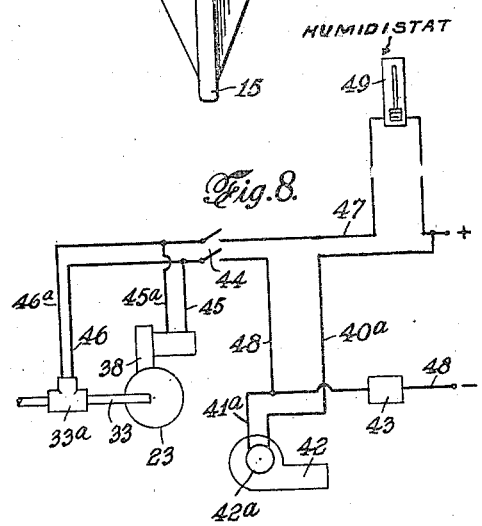
INVENTORS:
ROBERT E. DALY and BERNARD GOERG
BY Conrad A. Dieterich
their ATTORNEY.

Patented Dec. 19, 1939

2,184,094

UNITED STATES PATENT OFFICE 2,184,094

HUMIDIFYING APPARATUS

Robert E. Daly, New York, and Bernard Goerg, Bronxville, N. Y., assignors, by mesne assignments, to American Radiator & Standard Sanitary Corporation, New York, N. Y., a corporation of Delaware Application November 25, 1936, Serial No. 112,814

5 Claims. (Cl. 261—12)

Our invention relates to improvements in air conditioning means, and the same has for its object to provide a simple, efficient and comparatively inexpensive humidifying apparatus to be operated in conjunction with a house heating boiler or heating apparatus.

Further, said invention has for its object to provide a humidifying apparatus which may be readily applied to a boiler or like heating apparatus, whereby the water used will be vaporized and mingled with air, and the vapor-charged air then heated to such temperature as will prevent any material condensation occurring therein before the same is discharged into the room or space in which the atmosphere is to be ultimately controlled.

Further, said invention has for its object to provide an apparatus of the character specified in which a relatively small quantity of water is constantly vaporized and mixed with air, and the vapor charged-air supplied under pressure to the place of discharge.

Further, said invention has for its object to provide an apparatus of the character specified which may be readily attached to a boiler, and in which a jet of water is caused to be vaporized and mixed with air, the temperature of the mixture further increased, and the mixture thence forced under pressure from the apparatus to the place of discharge.

Further, said invention has for its object to provide a humidifying apparatus in which water is vaporized and mixed with air and initially heated, and thereafter the temperature of the mixture further increased so that the same, while passing to the place of discharge, will not lose heat to such degree that the entrained vapor will be condensed before the mixture can reach the place of its ultimate discharge into the room or space whereof the atmosphere is to be modified or conditioned.

Other objects will in part be obvious, and in part be pointed out hereinafter.

To the attainment of the aforesaid objects and ends our invention consists in the novel features of construction, and in the combination, connection and arrangement of parts hereinafter more fully described, and then pointed out in the claims.

In the accompanying drawings—

Figure 1 is a side elevation showing a boiler and one form of humidifying apparatus constructed according to and embodying our invention applied thereto;

Fig. 2 is an enlarged side elevation of the humidifying apparatus detached from the boiler;

Fig. 3 is a top view thereof;

Fig. 4 is a section on the line 4—4 of Fig. 3;

Fig. 5 is an enlarged detail side elevation of the heating element;

Fig. 6 is a vertical section thereof on the line 6—6 of Fig. 5;

Fig. 7 is a transverse section on the line 7—7 of Fig. 5, and

Fig. 8 is a diagrammatic view showing the circuit connections.

In said drawings 10 designates a boiler of the type generally used for house heating purposes, and 11 denotes the humidifying apparatus connected thereto comprising a hollow cast metal heating element 12 of substantially rectangular outline and provided upon its outer surface with vertically extended surface members or fins 13 coextensive in length with the height of the heating element. The interior surfaces of the heating element are also provided with extended surface members or fins 14 which are substantially coextensive in length with the interior height of the element. As can be seen more clearly from an examination of Figs. 5 and 6 of the drawings, the heating element 12 is constructed as a relatively thin slab-like body. The heating element 12 is provided at its base with a supporting foot 15, and upon one side at its top, and near its central portion with tapped studs or lugs 16, 17, respectively. The said side is further provided with a flange at the upper edge thereof between the lugs 16 to form a barrier and therebelow in its upper part with a depression or recess 18. Upon its opposite side, adjacent its upper end, said heating element 12 is provided with an intake port 19 to which is connected one end of a supply pipe 20 extending from the steam or water space of the boiler 10, and at its lower end said heating element is provided with an outlet port 21 to which is connected one end of a return pipe 22 leading to the boiler 10.

The heating element 12 is disposed within a rectangular sheet metal housing 23, preferably made of copper, and said heating element is secured in position therein against a side wall of the housing by screws 24 which pass through said side wall and into the studs or lugs 16, 17 of said heating element.

The casing 23 is provided in its top with one or more outlet openings 25 in which may be secured the ends of sheet metal delivery pipes or ducts 26, and at its base said casing is provided with a small outlet 27 to which is connected a drain pipe 28 for the removal of excess water or of any condensate which may be produced or collect in the apparatus.

The casing 23 is provided in its side to which the heating element 12 is secured with a circular opening 29 which is disposed centrally with respect to the depression or recess 18 in the side of the heating element, and over said opening is secured one end of a tubular housing 30 which is disposed at right angles to the casing and secured to the wall thereof by the screws 24 passing through ears or lugs 31 on the inner end of said tubular housing 30. Within the closed outer end 31a of the housing 30 is centrally mounted a water spray nozzle 32 connected to one end of a supply pipe 33 extending from a source of water supply. The supply pipe 33 is provided with a solenoid valve 33a for controlling the same.

Upon the side of the nozzle 32 is a bearing 32a in which is adjustably secured one end of a rod 34 having a circular target or distributing plate 35, preferably of non-corrosive metal such as stainless steel, secured at its free end. The said target or distributing plate 35 is disposed within the recess or depression 18 of the heating element 12 but in spaced relation thereto in order to permit of the free circulation of heated air and fluid around the same.

The tubular housing 30 is provided in its upper side adjacent its outer end with a flanged opening 36 in which is fitted the discharge end 37 of electrically operated rotary blower 38 having an inlet opening 39. The blower 38 is mounted upon a bracket 40 secured by screws 41 to the upper side of said tubular housing 30.

In the diagram, Fig. 8, the conductors 47, 48 extend from a suitable source of electric energy, and include a humidostat 49 for automatically controlling the operation of the solenoid 33a and the motor of the blower 38. The conductor 47 includes a double-pole switch 44, and has a branch 46a leading to one terminal of the solenoid valve 33a controlling the water supply, a branch 45a, leading to one terminal of the humidifier blower 38, and a branch 40a, in advance of the switch 44, leading to one terminal of the burner 42. The conductor 48 includes the burner relay or control device 43, and has branches 41a, 45 and 46 connected to the remaining terminals of the blower motor 42a of the burner 42, blower 38 and solenoid valve 33a, respectively, thus operatively connecting said elements in order that the humidifying apparatus will be rendered operative when the oil burner 42 is operating, and rendered inoperative when the operation of the burner is discontinued.

The operation of the apparatus will be largely obvious from the foregoing description. It is to be noted, however, that by disposing the heating element 12 in spaced relation to the inner walls of the housing or casing 23 an approximately U-shaped passage duct is formed causing the vapor-charged fluid to contact with both of the major sides and the bottom of the heating element in the passage of said fluid through the casing 23.

Further, it is to be noted that the water jet projected by the nozzle 32 forcibly against the distributing plate 35 serves to thoroughly atomize the water and causes the same to become thoroughly mixed with the incoming air, which enters the casing 23 at right angles to the normal plane of the heating element 12 before the vapor-charged mixture impinges upon the heated surfaces of said heating element to become heated thereby, and by passage thereof through the duct formed between the walls of the casing 23 and the heating element 12, thus insuring the vaporization of the mixture to the requisite degree.

Further, it is to be noted that by providing the heating element upon both its outer and inner surfaces with vertically extending ribs or members 13, 14, respectively the heating element presents a relatively large volume of highly heated metal to the passage of the vaporized or atomized fluid mixture and causes said heating element to heat the same to such temperature as will deliver the fluid without undue condensation or sediment at the point of ultimate discharge.

Where the humidifying apparatus is described in the specification and claims as being connected to the "water space" of the boiler it is to be understood that said designation is not to be regarded as a limitation as the said term is merely employed as a matter of convenience since the apparatus is equally adapted for connection with the "steam space" or the heating fluid source of a boiler or other heating apparatus.

Having thus described our said invention what we claim and desire to secure by Letters Patent is:

1. A humidifying apparatus comprising a hollow heating element having an extended contact surface, vertical ribs upon the inner and outer surfaces thereof, means for connecting said heating element with the water space of a boiler, a casing enclosing said heating element with its walls in spaced relation to said heating element, air intake and outlet ports in said casing, a spray nozzle in said casing, a source of water supply therefor, a distributing plate closely associated with said heating element, a support for said distributing plate, means on said nozzle for adjustably securing said support in position; said spray nozzle serving to project a jet of water against said distributing plate to vaporize said water and mix the same with air and a blower connected with said casing for forcing the vapor-charged air through said casing and around said heating element.

2. A humidifying apparatus comprising a hollow heating element presenting an extended contact surface, means for connecting said heating element with the water space of a boiler, a casing enclosing said heating element with its wall in spaced relation to said heating element, air intake and outlet ports in said casing, a spray nozzle in said casing disposed at right angles to said heating element, a water supply pipe connected to said nozzle, a valve in said supply pipe, a distributing plate closely associated with the impact surface of said heating element, means for supporting said distributing plate, said spray nozzle serving to project a jet of water against said distributing plate to vaporize said water and mix the same with the air, a blower connected to said casing adjacent the intake port thereof for forcing the vapor-charged air against said heating element and through said casing, means for operating said blower, and means for controlling the operation of said water supply valve and said blower operating means.

3. A humidifying apparatus comprising a hollow heating element having a recess in its side, means connecting said heating element with the heating-fluid space of a boiler, a casing enclosing said heating element and having air intake and outlet means, a spray nozzle extending into said casing, a source of water supply therefor, a distributing plate disposed within the recess in said heating element, said spray nozzle serving to project the water against said distributing plate to atomize said water and to mix the same with the incoming air, and means associated with said casing for forcing the vapor-charged air against and around said heating element to heat the same and discharging the humidified air from said casing through the outlet means thereof.

4. A humidifying apparatus comprising a hollow heating element having extended opposite faces and a recess in one face at the upper portion thereof, a casing disposed about said heating element and spaced from said opposite faces to provide a passage extending about said heating element coextensive with said faces, means for closing said passage between the top of said heating element at the recessed side thereof and said casing, an air intake portion disposed normal to the contiguous face of said heating element in line with the recess therein, an outlet port at the discharge end of said passage above said heating element, a distributing plate disposed within said recess, means within said air intake portion for projecting a jet of water against said distributing plate and mixing the water with the incoming air in advance of said heating element, and means for forcing the humidified air through said passage and from said casing.

5. A unitary humidifying attachment for household boilers, comprising a hollow heating element including inlet and outlet pipe connections for the circulation therethrough of heating fluid from a boiler, said element including a pair of opposed upright side walls of relatively large areas, respectively, and bottom, top, and end walls joining the side walls at their marginal edges and spacing such side walls apart a relatively small distance to provide therewith a relatively thin, slab-like body; a casing enclosing said heating element and including a pair of opposed side walls and a bottom wall spaced respectively from the element side and bottom walls to provide therewith an approximately U-shaped air passage extending about said element; said casing having an air inlet opening in one side wall thereof at the top of one leg of said U-shaped passage and an air outlet opening at the top of the other leg of said passage; means above said inlet opening for closing the upper end of said one leg of the passage; a humidifier casing secured to the outside of said first-named casing about said air inlet opening; a water spray device in said humidifier casing; a blower secured to said humidifier casing and operable to force air through said water spray and said air inlet opening and against the upper end of the adjacent element side wall and then through said air passage and the air outlet opening.

ROBERT E. DALY.
BERNARD GOERG.